| (12) | United States Patent | (10) Patent No.: | US 9,677,445 B2 |
|---|---|---|---|
| | Nunez et al. | (45) Date of Patent: | Jun. 13, 2017 |

(54) SELECTIVE DOSING MODULE CONTROL SYSTEM

(71) Applicant: Cummins Emission Solutions, Inc., Columbus, IN (US)

(72) Inventors: Rafael Nunez, Madison, WI (US); Atul Abhyankar, Columbus, IN (US); Ken Hummel, Stoughton, WI (US); Justin Kruer, Franklin, IN (US); Tyler Lorenz, McFarland, WI (US); Farshad Farid, Louisville, KY (US); Arun Shori Sundaravel, Columbus, IN (US)

(73) Assignee: Cummins Emission Solutions, Inc., Columbus, IN (US)

( * ) Notice: Subject to any disclaimer, the term of this patent is extended or adjusted under 35 U.S.C. 154(b) by 0 days.

(21) Appl. No.: 15/377,379

(22) Filed: Dec. 13, 2016

(65) Prior Publication Data

US 2017/0089245 A1    Mar. 30, 2017

Related U.S. Application Data

(63) Continuation of application No. 14/943,584, filed on Nov. 17, 2015, now Pat. No. 9,551,251, which is a
(Continued)

(51) Int. Cl.
*F01N 3/00* (2006.01)
*F01N 3/20* (2006.01)
(Continued)

(52) U.S. Cl.
CPC ......... *F01N 3/208* (2013.01); *B01D 53/9418* (2013.01); *B01D 53/9495* (2013.01);
(Continued)

(58) Field of Classification Search
CPC ..... F01N 3/208; F01N 3/021; B01D 53/9418; B01D 53/9495
(Continued)

(56) References Cited

U.S. PATENT DOCUMENTS 5,756,059 A    5/1998  Zamansky et al.
6,125,629 A   10/2000  Patchett
(Continued)

FOREIGN PATENT DOCUMENTS

WO    WO 2004/058642 A1    7/2004

OTHER PUBLICATIONS

International Search Report and Written Opinion for PCT/US2014/071523, issued Apr. 17, 2015, 6 pages.

*Primary Examiner* — Jason Shanske
(74) *Attorney, Agent, or Firm* — Foley & Lardner LLP

(57) ABSTRACT

Systems and methods to selectively control plurality of dosing modules may include receiving data indicative of an exhaust flow rate. An amount of reductant to be dosed may be determined based, at least in part, on the data indicative of the exhaust flow rate. A decomposition delay time may also be determined and a first dosing module and a second dosing module may be selectively activated. The first dosing module may be selectively activated at a first time and the second dosing module is selectively activated at a second time. The second time is based on the first time and the determined decomposition delay time.

20 Claims, 10 Drawing Sheets

Related U.S. Application Data continuation of application No. 14/157,215, filed on Jan. 16, 2014, now Pat. No. 9,192,892.

(51) Int. Cl.
*F01N 3/035* (2006.01)
*G05D 7/06* (2006.01)
*B01D 53/94* (2006.01)

(52) U.S. Cl.
CPC ........... *F01N 3/035* (2013.01); *G05D 7/0617* (2013.01); *F01N 2570/14* (2013.01); *F01N 2610/146* (2013.01); *F01N 2900/0414* (2013.01)

(58) Field of Classification Search
USPC .......................................................... 60/286
See application file for complete search history.

(56) References Cited

U.S. PATENT DOCUMENTS

| | | |
|---|---|---|
| 6,361,754 B1 | 3/2002 | Peter-Hoblyn et al. |
| 6,996,975 B2 | 2/2006 | Radhamohan et al. |
| 7,264,785 B2 | 9/2007 | Blakeman et al. |
| 8,015,801 B2 | 9/2011 | Oberski et al. |
| 8,109,077 B2 | 2/2012 | Reba et al. |
| 8,381,514 B2 | 2/2013 | Salanta et al. |
| 2006/0137328 A1* | 6/2006 | Takeshima ......... B01D 53/9431 60/286 |
| 2008/0050297 A1 | 2/2008 | Harold et al. |
| 2009/0004083 A1 | 1/2009 | Valentine et al. |
| 2009/0301066 A1 | 12/2009 | Sindano et al. |
| 2010/0139260 A1 | 6/2010 | Rodman et al. |
| 2011/0030343 A1 | 2/2011 | Kiser et al. |
| 2011/0146240 A1 | 6/2011 | Wilhelm et al. |
| 2011/0197569 A1 | 8/2011 | Salanta et al. |
| 2012/0073264 A1 | 3/2012 | Li et al. |

* cited by examiner

SELECTIVE DOSING MODULE CONTROL SYSTEM

CROSS-REFERENCE TO RELATED APPLICATIONS

The present application is a continuation of U.S. patent application Ser. No. 14/943,584, filed Nov. 17, 2015, which is a continuation of U.S. patent application Ser. No. 14/157,215, filed Jan. 16, 2014, now U.S. Pat. No. 9,192,892. The contents of both applications are incorporated herein by reference in their entirety.

TECHNICAL FIELD

The present application relates generally to the field of fluid delivery systems for an exhaust system. More specifically, the present application relates to fluid delivery systems for selective catalytic reduction (SCR) systems.

BACKGROUND

For internal combustion engines, such as diesel engines, nitrogen oxide ($NO_x$) compounds may be emitted in the exhaust. To reduce $NO_x$ emissions, a SCR process may be implemented to convert the $NO_x$ compounds into more neutral compounds, such as diatomic nitrogen, water, or carbon dioxide, with the aid of a catalyst and a reductant. The catalyst may be included in a catalyst chamber of an exhaust system, such as that of a vehicle or power generation unit. A reductant, such as anhydrous ammonia, aqueous ammonia, or urea is typically introduced into the exhaust gas flow prior to the catalyst chamber. To introduce the reductant into the exhaust gas flow for the SCR process, an SCR system may dose or otherwise introduce the reductant through a dosing module that vaporizes or sprays the reductant into an exhaust pipe of the exhaust system up-stream of the catalyst chamber.

SUMMARY

One implementation relates to a system for selectively dosing reductant into an exhaust system. The system includes a first dosing module, a second dosing module, and a controller. The controller is configured to receive data indicative of an exhaust flow rate, determine an amount of reductant based, at least in part, on the data indicative of the exhaust flow rate, and determine a decomposition delay time. The controller is further configured to selectively activate the first dosing module at a first time and selectively activate the second dosing module at a second time. The second time being based on the first time and the decomposition delay time.

Another implementation relates to a method for selectively dosing reductant into an exhaust system. The method includes receiving data indicative of an exhaust flow rate, determining an amount of reductant based, at least in part, on the data indicative of the exhaust flow rate, and determining a decomposition delay time. The method further includes selectively activating a first dosing module at a first time and selectively activating a second dosing module at a second time. The second time being based on the first time and the decomposition delay time.

Yet a further implementation relates to a non-transitory computer-readable medium storing instructions that, when executed by one or more processors, cause the one or more processors perform several operations. The operations include receiving data indicative of an exhaust flow rate, determining an amount of reductant based, at least in part, on the data indicative of the exhaust flow rate, and determining a decomposition delay time. The operations further include selectively activating a first dosing module at a first time and selectively activating a second dosing module at a second time. The second time being based on the first time and the decomposition delay time.

These and other features of the implementations described herein, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Figure 1:
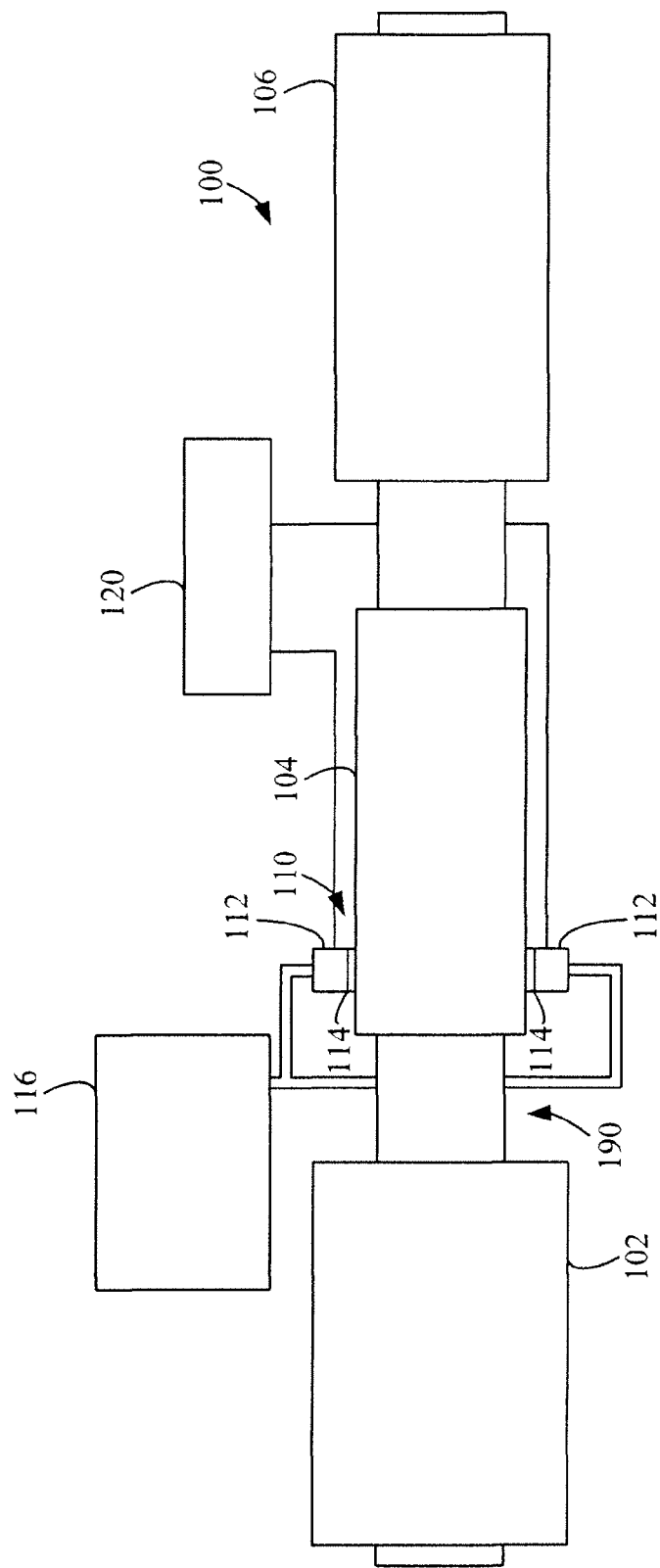
FIG. 1 is a block schematic diagram of an example selective catalytic reduction system having an example reductant delivery system for an exhaust system.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

I. Overview

In some instances, large amounts of horsepower provided by an internal combustion engine, such as a diesel engine, may be needed or desired, such as, for example very large trucks, mining equipment, locomotives, etc. To meet such a need, large internal combustion engines, such as diesel engines, may be developed. However, as engine size and power increase, the amount of nitrogen oxide ($NO_x$) compounds produced by such engines may also be increased. The $NO_x$ compounds may be emitted into the exhaust. To reduce $NO_x$ emissions, a SCR process may be implemented to convert the $NO_x$ compounds into more neutral compounds, such as diatomic nitrogen, water, or carbon dioxide, with the aid of a catalyst and a reductant. The catalyst may be included in a catalyst chamber of an exhaust system. A reductant, such as anhydrous ammonia, aqueous ammonia, or urea is typically introduced into the exhaust gas flow prior to the catalyst chamber. However, as engine size increases, the amount of reductant needed to reduce the $NO_x$ compounds similarly increases. Accordingly, large amounts of reductant may need to be introduced into an exhaust system to effectively reduce the $NO_x$ compounds. In some implementations, the rate at which the reductant is dosed into the exhaust system may be increased. However, some dosing modules may have a maximum dosing rate capability that may not meet the needed amount of reductant.

In some implementations, a system may selectively control the dosing of reductants from multiple dosing modules in a system, either staged in series or located in a single decomposition chamber, to remove $NO_x$ compounds from exhaust gasses. The system may utilize a process that involves the selective use of two or more dosing modules to dose reductants into a decomposition chamber to maximize the effectiveness of the dosing to remove $NO_x$ compounds from the exhaust gas stream. The system may control two or more dosing modules in the same system, either located in the same decomposition chamber dosing reductant or dosing in series within a system. The timing and selection of the dosing of the reductant may be determined by control logic of a controller to maximize the efficiency of the dosing, maximize the effective use of the reductant, minimize potential negative factors from two or more dosing modules dosing in the same chamber or system (such as deposit formation), and/or overdosing.

The process may permit the dosing of reductant at various intervals in coordination between two or more dosing modules for dosing reductant in the same decomposition chamber or within the same system. The process may allow the dosing of reductant to be controlled based on an exhaust flow rate by selectively controlling the dosing of each dosing module into the exhaust gas stream.

In some implementations, the dosing modules may each dose a certain amount of reductant simultaneously over a period of time to meet the desired amount of reductant. That is, over a given period, such as one second, each dosing module of the plurality of dosing modules may dose reductant into the exhaust system for a predetermined period of time over the given period, such as 100 milliseconds (ms), such that the total amount of reductant dosed by the dosing modules meets the needed amount of reductant. In some implementations, two, three, four, or more dosing modules may be used.

In other implementations, the dosing modules may dose at different times based on a delay time between each dosing module. That is, over a given period, such as one second, a first dosing module of the plurality of dosing modules may dose reductant into the exhaust system for a predetermined period of time over the given period, such as 100 ms. A second dosing module of the plurality of dosing modules may dose reductant into the exhaust system for a predetermined period of time over the given period, such as 100 ms. The dosing by the first dosing module and the second dosing module may be offset by a time delay. The predetermined period of time for the first dosing module and the second module may be determined such that the total amount of reductant dosed by the dosing modules meets the needed amount of reductant. In some implementations, two, three, four, or more dosing modules may be used. The time delay between modules may be determined such that the dosing by the several modules is substantially evenly spaced over the given period.

In still further implementations, a first dosing module may be utilized to perform the dosing until the needed amount of reductant exceeds the first dosing module's maximum amount that can be dosed in a given period. A second dosing module may then be used to provide the additional reductant up to the needed amount of reductant. In some implementations, two, three, four, or more dosing modules may be used. Thus, if the needed amount of reductant exceeds the maximum amount that can be provided by the first and second dosing modules, a third dosing module or more may be used to provide the additional reductant.

In some implementations, the dosing modules may cycle in sequencing such that the duty cycle for each dosing module of plurality of dosing modules is substantially the same over N operating cycles, where N is the number of dosing modules.

While the foregoing has given an overview of controlling multiple dosing modules, following below are more detailed descriptions of various concepts related to, and implementations of, methods, apparatuses, and systems for introducing a reductant to an exhaust system using plurality of dosing modules. The various concepts introduced above and discussed in greater detail below may be implemented in any of numerous ways, as the described concepts are not limited to any particular manner of implementation. Examples of specific implementations and applications are provided primarily for illustrative purposes.

II. Overview of Selective Catalytic Reduction System

FIG. 1 depicts an selective catalytic reduction system 100 having an example reductant delivery system 110 for an exhaust system 190. The selective catalytic reduction system 100 includes a diesel particulate filter (DPF) 102, the reductant delivery system 110, a decomposition chamber or reactor 104, and a SCR catalyst 106.

The DPF 102 is configured to remove particulate matter, such as soot, from exhaust gas flowing (indicated by arrow 192) in the exhaust system 190. The DPF 102 includes an inlet, where the exhaust gas is received, and an outlet, where the exhaust gas exits after having particulate matter substantially filtered from the exhaust gas and/or converting the particulate matter into carbon dioxide.

The decomposition chamber 104 is configured to convert a reductant, such as urea, aqueous ammonia, or diesel exhaust fluid (DEF) into ammonia. As will be described in greater detail herein, the decomposition chamber 104 includes a reductant delivery system 110 having a plurality of dosing modules 112 configured to dose the reductant into the decomposition chamber 104. In some implementations, the urea, aqueous ammonia, DEF is injected upstream of the SCR catalyst 106. The reductant droplets then undergo the processes of evaporation, thermolysis, and hydrolysis to form gaseous ammonia within the exhaust system 190. The decomposition chamber 104 includes an inlet in fluid communication with the DPF 102 to receive the exhaust gas containing $NO_x$ emissions and an outlet for the exhaust gas, $NO_x$ emissions, ammonia, and/or remaining reductant to flow to the SCR catalyst 106.

The SCR catalyst 106 is configured to assist in the reduction of $NO_x$ emissions by accelerating a $NO_x$ reduction process between the ammonia and the $NO_x$ of the exhaust gas into diatomic nitrogen, water, and/or carbon dioxide. The SCR catalyst 106 includes inlet in fluid communication with the decomposition chamber 104 from which exhaust gas and reductant is received and an outlet.

The exhaust system 190 may further include a diesel oxidation catalyst (DOC) in fluid communication with the exhaust system 190 (e.g., downstream of the SCR catalyst 106, or upstream of the DPF 102) to oxidize hydrocarbons and carbon monoxide in the exhaust gas.

As noted above, the decomposition chamber 104 includes a plurality of dosing modules 112 mounted to the decomposition chamber 104 such that the plurality of dosing modules 112 may dose a reductant, such as urea, aqueous ammonia, or DEF, into the exhaust gases flowing in the exhaust system 190. The plurality of dosing modules 112 may each include an insulator 114 interposed between the a portion of the dosing module 112 and the portion of the decomposition chamber 104 to which the dosing module 112 is mounted. The plurality of dosing modules 112 are fluidly coupled to one or more reductant sources 116. In some implementations, each dosing module 112 may be fluidly coupled to a corresponding reductant source 112 or the plurality of dosing module 112 may be coupled to the same reductant source 116. In some implementations, a pump (not shown) may be used to pressurize the reductant source 116 for delivery to the dosing modules 112.

The plurality of dosing modules 112 are also electrically or communicatively coupled to a controller 120. The controller 120 is configured to control each dosing module 112, as will be described in greater detail herein. The controller 120 may include a microprocessor, an application-specific integrated circuit (ASIC), a field-programmable gate array (FPGA), etc., or combinations thereof. The controller 120 may include memory which may include, but is not limited to, electronic, optical, magnetic, or any other storage or transmission device capable of providing a processor, ASIC, FPGA, etc. with program instructions. The memory may include a memory chip, Electrically Erasable Programmable Read-Only Memory (EEPROM), erasable programmable read only memory (EPROM), flash memory, or any other suitable memory from which the controller 120 can read instructions. The instructions may include code from any suitable programming language.

III. Example Configurations for Reductant Delivery Systems

Figure 2:
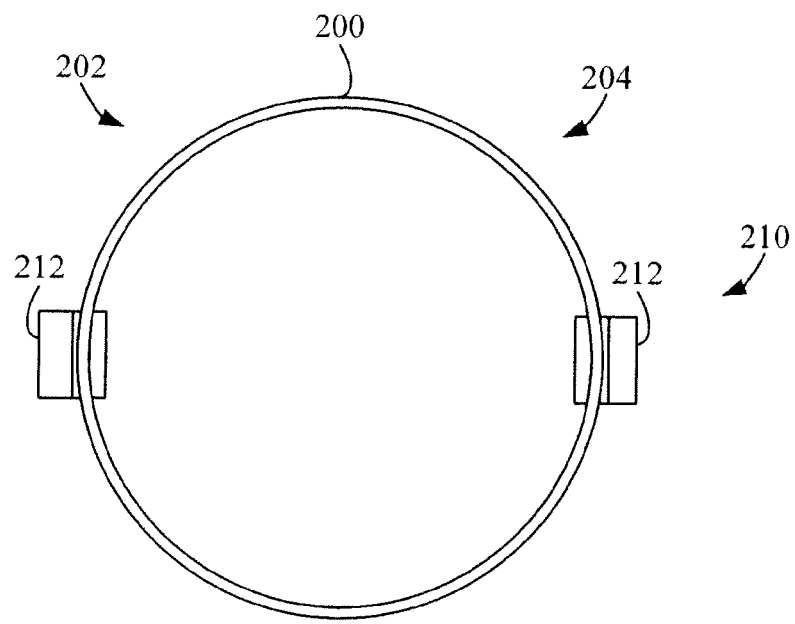
FIG. 2 is a front elevation view of an example reductant delivery system having two dosing modules for a decomposition chamber.

FIG. 2 depicts an example reductant delivery system 210 for a decomposition chamber 200 having two dosing modules 212 mounted to the decomposition chamber 200. The dosing modules 212 may each include an insulator 214 interposed between a portion of the dosing module 212 and the portion of the decomposition chamber 200 to which the dosing module 212 is mounted. In the present example, the dosing modules 212 are mounted to the decomposition chamber 200 at substantially the same longitudinal axial position, but at different angular positions about the decomposition chamber 200. As shown in FIG. 2, the dosing modules 212 are positioned opposite each other on a left side 202 and a right side 204 of the decomposition chamber 200. In other implementations, the dosing modules 212 may be at other angular positions relative to each other. For example, a dosing module 212 may be located on the left side 202 at 60 degrees from a vertical axis towards the top of the decomposition chamber 200 and the other dosing module 212 may be located on the right side 204 at 60 degrees from the vertical axis towards the top of the decomposition chamber 200, thereby forming a substantial V shape orientation relative to each other. Of course, any other positioning of the dosing modules 212 about the decomposition chamber 200 may be used.

Figure 3:
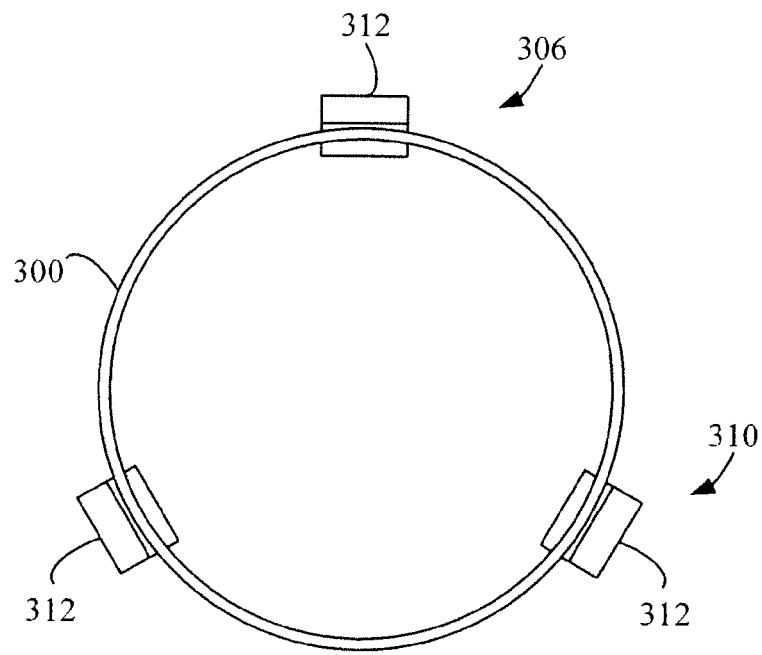
FIG. 3 is a front elevation view of another example reductant delivery system having three angularly offset dosing modules for a decomposition chamber.

FIG. 3 depicts another example reductant delivery system 310 for a decomposition chamber 300 having three dosing modules 312 mounted to the decomposition chamber 300. The dosing modules 312 may each include an insulator 314 interposed between a portion of the dosing module 312 and the portion of the decomposition chamber 300 to which the dosing module 312 is mounted. In the present example, the dosing modules 312 are mounted to the decomposition chamber 300 at substantially the same longitudinal axial position, but at different angular positions about the decomposition chamber 300. As shown in FIG. 3, the dosing modules 312 are equally spaced about the decomposition chamber 300, such as at 120 degree intervals with a dosing module 312 located at a top 306 of the decomposition chamber 300. Of course, the dosing modules 312 may be positioned at other angular positions relative to each other. Furthermore, it should be understood that more than three dosing modules 312 may be used. For example, four dosing modules, five dosing modules, etc.

Figure 4:
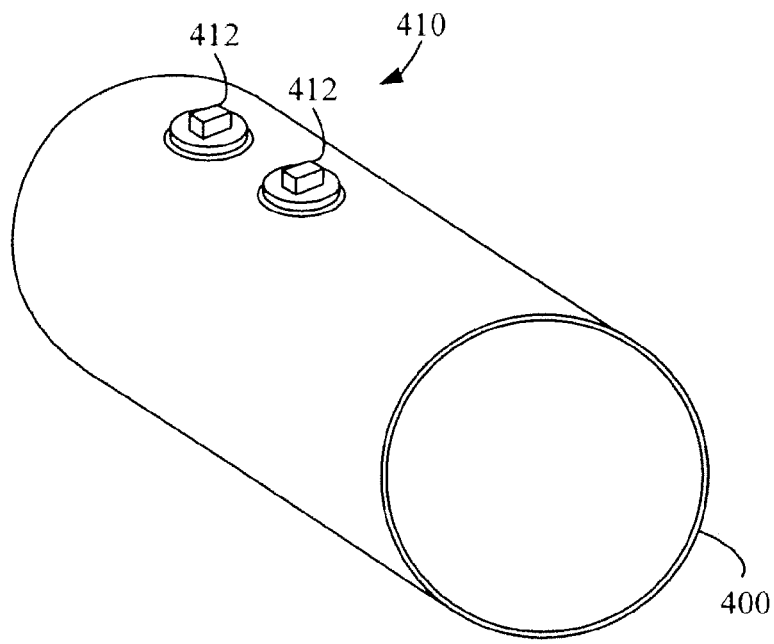
FIG. 4 is a perspective view of another example reductant delivery system having two axially aligned dosing modules for a decomposition chamber.

FIG. 4 depicts another example reductant delivery system 410 for a decomposition chamber 400 having two axially aligned dosing modules 412 mounted to the decomposition chamber 400. The dosing modules 412 may each include an insulator 414 interposed between a portion of the dosing module 412 and the portion of the decomposition chamber 400 to which the dosing module 412 is mounted. In the present example, the dosing modules 412 are mounted to the decomposition chamber 400 at substantially the same angular position, but at different longitudinal axial locations. It should be understood that more than three dosing modules 312 may be used. For example, four dosing modules, five dosing modules, etc.

In some implementations, the dosing modules described herein may be both axially offset and angularly offset (i.e., a combination of FIGS. 2-3 and FIG. 4). Furthermore, it should be understood that any number of dosing modules may be used. For example, four dosing modules, five dosing modules, etc.

IV.

As noted above, plurality of dosing modules, such as dosing modules 112 of FIG. 1, are electrically or communicatively coupled to a controller, such as controller 120 of FIG. 1. Described in greater detail herein are processes that may be implemented by the controller to control the dosing by the plurality of dosing modules.

Figure 5A:
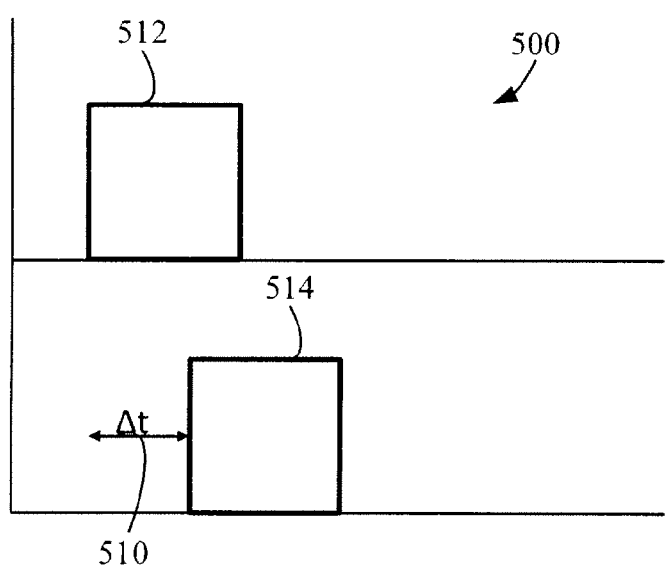
FIG. 5A is a graph of the timing of dosing by two dosing modules having a first time delay with the dosing overlapping.
Figure 5B:
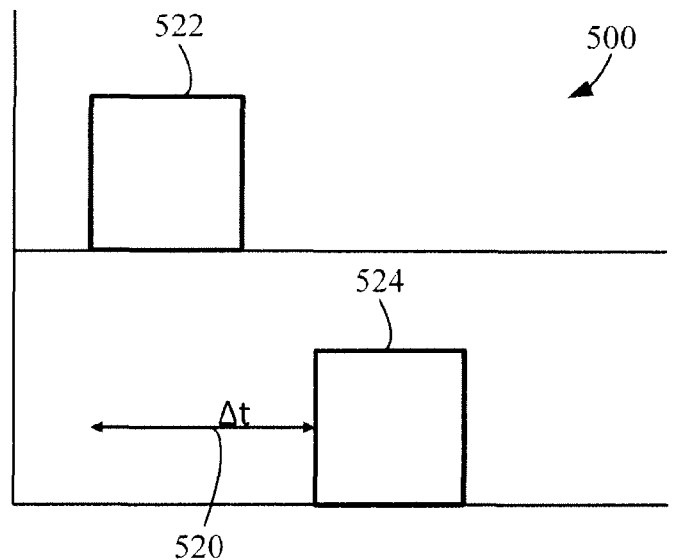
FIG. 5B is a graph of the timing of dosing by two dosing modules having a second time delay with the dosing not overlapping.
Figure 5C:
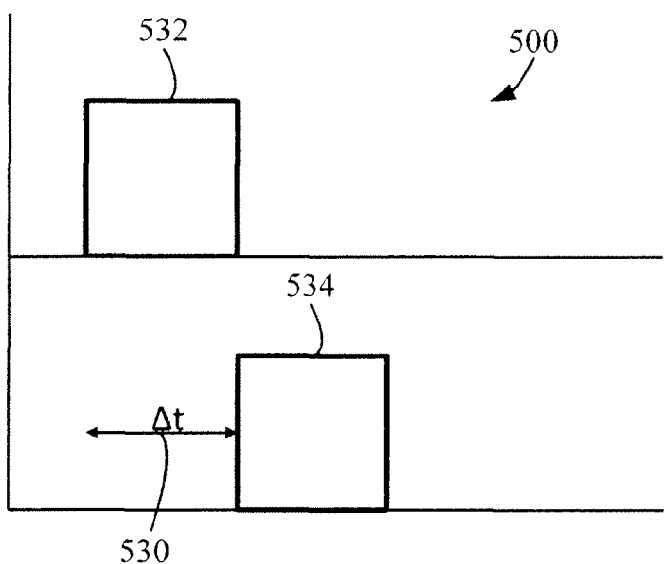
FIG. 5C is a graph of the timing of dosing by two dosing modules having a third time delay with the dosing of a first dosing module ending when the dosing of a second dosing module begins.

FIGS. 5A-5C depict various dosing scenarios for two dosing modules. It should be understood that the following scenarios may be further applied to three, four, five or more dosing modules. FIG. 5A depicts a graph 500 of the timing of dosing by two dosing modules having a first time delay 510 with the dosing overlapping. As shown, a first dosing module doses for first time period 512. The second dosing module doses for a second time period 514, which is offset by the first time delay 510. As illustrated, the second dosing module starts to dose prior to the first dosing module ceasing dosing. Thus, the first time period 512 of the dosing by the first dosing module and the second time period 514 of the dosing by the second dosing module overlap.

FIG. 5B depicts the graph 500 of the timing of dosing by two dosing modules having a second time delay 520 with the dosing not overlapping. As shown, a first dosing module doses for first time period 522. The second dosing module doses for a second time period 524, which is offset by the second time delay 520. As illustrated, the second dosing module starts to dose after the first dosing module has ceased dosing. Thus, the first time period 522 of the dosing by the first dosing module and the second time period 524 of the dosing by the second dosing module do not overlap.

FIG. 5C depicts the graph 500 of the timing of dosing by two dosing modules having a third time delay 530 with the dosing of a first dosing module ending when the dosing of a second dosing module begins. As shown, a first dosing module doses for first time period 532. The second dosing module doses for a second time period 534, which is offset by the second time delay 530. As illustrated, the second dosing module starts to dose as the first dosing module ceases dosing. Thus, the first time period 532 of the dosing by the first dosing module and the second time period 534 of the dosing by the second dosing module "abut."

Figure 6:
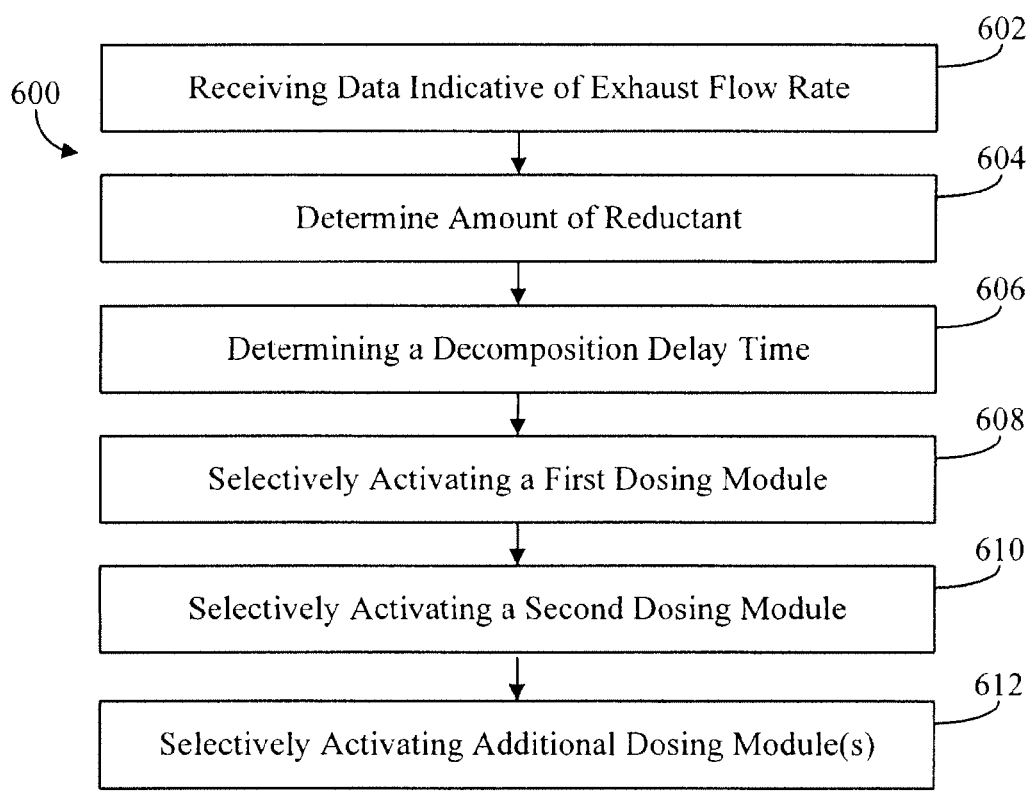
FIG. 6 is a flow diagram of an example process for a controller to control the dosing of reductant into an exhaust system using plurality of dosing modules.

FIG. 6 is a flow diagram of an example process 600 for a controller to control the dosing of reductant into an exhaust system using plurality of dosing modules. At 602, the process 600 includes receiving data indicative of an exhaust flow rate. The data indicative of the exhaust flow rate may include and/or be determined based on an engine speed selection, a flow velocity measurement, or a combination of calculated and measured components including air mass flow, fuel flow, temperature, pressure, rate of change of those, or a combination of all or some of those, etc. The data indicative of the exhaust flow rate may be communicated from one or more sensors.

At 604, an amount of reductant may be determined by a controller. The amount of reductant may be determined based, at least in part, on the data indicative of the exhaust flow rate. For example, amount of reductant may be determined based on an engine speed selection (e.g., an operating speed of the engine at known speed-load points) or engine operating parameters. In other implementations, the amount of reductant may be determined based on other data, either in addition or instead of the data indicative of the exhaust flow rate. The amount of reductant may be based on a dosing rate of one of more dosing modules, an exhaust gas temperature, etc.

At 606, a decomposition delay time may be determined by a controller. The decomposition delay time is a delay between dosing modules, such as a first dosing module and a second dosing module. In some implementations, the decomposition delay time may be determined as a function of a dosing rate of the dosing modules, an exhaust gas temperature, an exhaust flow rate, an evaporative cooling rate for the reductant, a heat transfer environment, a current temperature of the system, and/or may be empirically determined for various conditions (e.g., for various engine speed-load points, exhaust flow rate and temperatures, etc.), and measured and calculated parameters. The decomposition delay time may be determined such that decomposition may occur while avoiding deposits and providing $NH_3$ to the catalyst as close to the dosing time as possible. If a delay time is too short, deposits may form within the exhaust system. If the delay time is too long, the system may not be able to dose the amount of reductant needed. In some implementations, the decomposition delay time may be in 100 ms intervals. In some implementations, the decomposition delay time to dosing module pulse frequency may be $1/10^{th}$ to $6/10^{ths}$ (e.g., for 1 Hz dosing module pulses, the decomposition delay time may be between 100 ms and 600 ms). Of course, other delay times may be used.

In still further implementations, the decomposition delay time may be determined for plurality of dosing modules. For example, in a system with three dosing modules, the decomposition delay time may be determined between dosing for a first module and a second module and between dosing for the second module and a third module.

At 608, a first dosing module is selectively activated by a controller and, at 610, a second dosing module is selectively activated by a controller. The first dosing module may be selectively activated at a first time and the second dosing module is selectively activated at a second time, with the second time being determined based on the first time and the determined decomposition delay time. That is, the determined decomposition delay time is utilized to time offset the activation of the second dosing module relative to the first dosing module.

In some implementations, the selective activation of the first dosing module and the second module may include selectively activating the second dosing module at a second time while the first dosing module is activated (e.g., overlapping, such as that shown in FIG. 5A). In further implementations, the selective activation of the first dosing module and the second module may include selectively activating the second dosing module after the first dosing module is deactivated (e.g., not overlapping, such as that shown in FIG. 5B). In still further implementations, the selective activation of the first dosing module and the second module may include selectively activating the second dosing module when the first dosing module is deactivated (e.g., abutting, such as that shown in FIG. 5C).

In some implementations, a third dosing module may be selectively activated by a controller at 612. The selective activation of the third dosing module may be at a third time that is based on the first time, the second time, and the decomposition delay time. Additional dosing modules may be activated as needed in a similar process by a controller. In still further implementations, such as if a dosing module fails or is otherwise rendered inoperable, the controller may be configured to keep dosing with any remaining dosing modules such that reductant is still dosed, but at a lesser level. Thus, for example, a vehicle incorporating such an engine may "limp home," such as to a location where the inoperable dosing module may be repaired and/or replaced.

Figure 7:
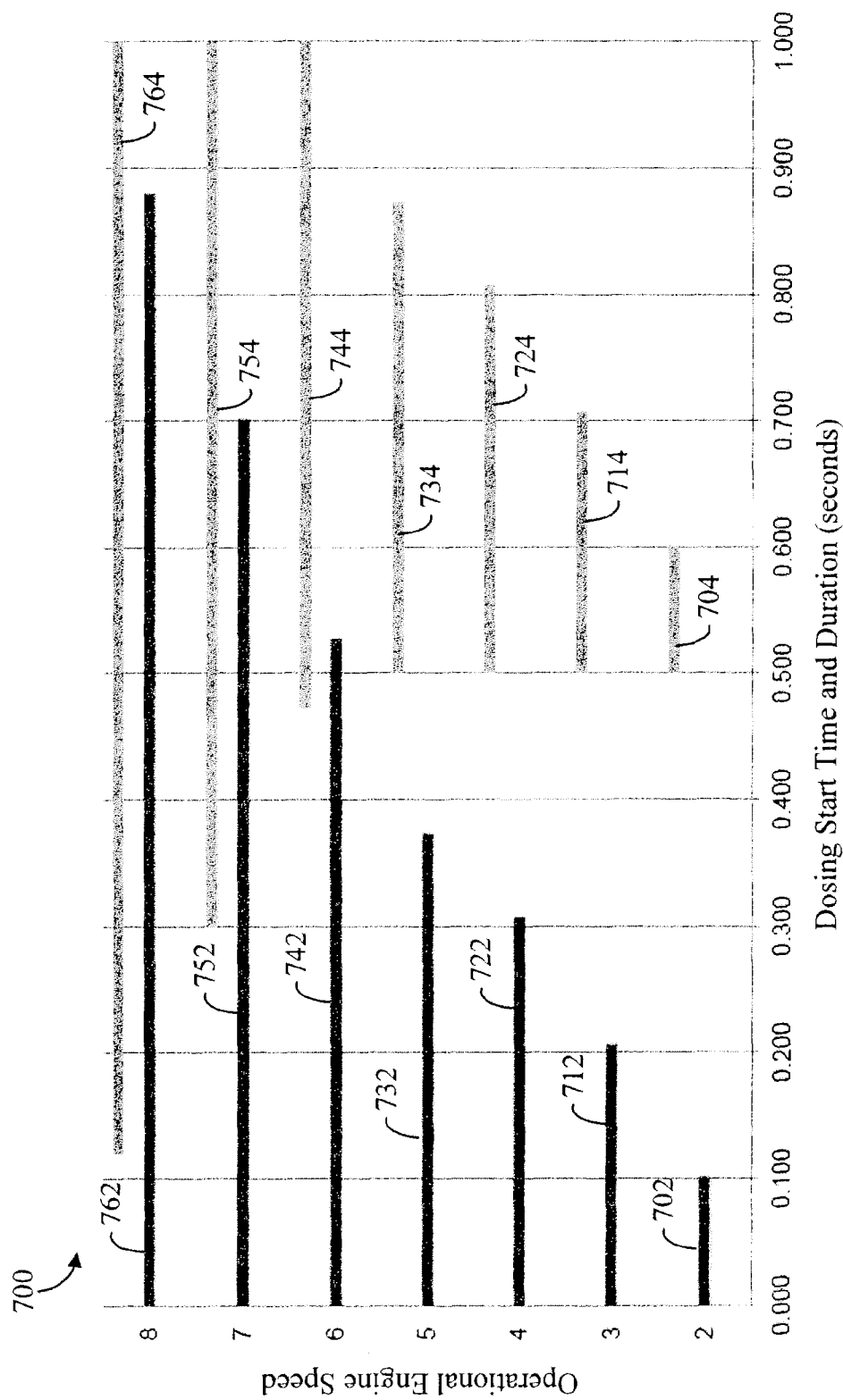
FIG. 7 is a graph of the dosing of reductant by two dosing modules over several operational speeds over a one second time period.

FIG. 7 is a graph 700 of the dosing of reductant by two dosing modules over several operational engine speeds over a one second time period. At a first operational speed, a first dosing module doses reductant for a first period of time 702. After a first decomposition delay time, such as 500 ms as shown, a second dosing module doses reductant for a second period of time 704. The first dosing module and the second dosing module may continue to alternate dosing based on the first decomposition delay. In the example shown, the dosing by the first dosing module for the first period of time 702 and the dosing by the second dosing module for the second period of time 704 do not overlap.

At a second operational speed, the first dosing module doses reductant for a first period of time 712. The second dosing module doses reductant for a second period of time 714 after the decomposition delay time of 500 ms. The first dosing module and the second dosing module may continue to alternate dosing based on the decomposition delay time. At a third operational speed, the first dosing module doses reductant for a first period of time 722. The second dosing module doses reductant for a second period of time 724 after the decomposition delay time of 500 ms. The first dosing module and the second dosing module may continue to alternate dosing based on the decomposition delay time. At a fourth operational speed, the first dosing module doses reductant for a first period of time 732. The second dosing module doses reductant for a second period of time 734 after the decomposition delay time of 500 ms. The first dosing module and the second dosing module may continue to alternate dosing based on the decomposition delay time.

At a fifth operational speed, the first dosing module doses reductant for a first period of time 742. After a second decomposition delay time, such as approximately 480 ms as shown, the second dosing module doses reductant for a second period of time 744. In the present example, the second decomposition delay time is reduced based on the second dosing module needing to be active for longer than the 500 ms time to meet the amount of reductant needed at the fifth operational speed. Thus, in the example shown, the dosing by the first dosing module for the first period of time 742 and the dosing by the second dosing module for the second period of time 744 overlap. The first dosing module and the second dosing module may continue to alternate dosing based on the second decomposition delay time.

At a sixth operational speed, the first dosing module doses reductant for a first period of time 752. After a third decomposition delay time, such as approximately 300 ms as shown, the second dosing module doses reductant for a second period of time 754. The first dosing module and the second dosing module may continue to alternate dosing based on the third decomposition delay time. At a seventh operational speed, the first dosing module doses reductant for a first period of time 762. After a fourth decomposition delay time, such as approximately 120 ms as shown, the second dosing module doses reductant for a second period of time 764. The first dosing module and the second dosing module may continue to alternate dosing based on the fourth decomposition delay time.

Figure 8A:
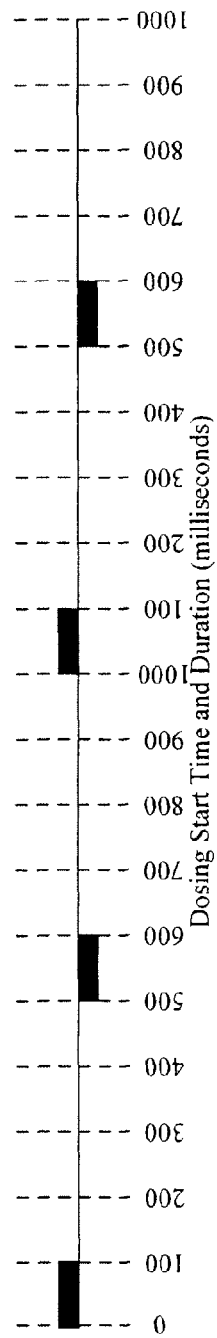
FIG. 8A is a graph of the alternating dosing of reductant by two dosing modules at a first operational speed over a two second time period.
Figure 8B:
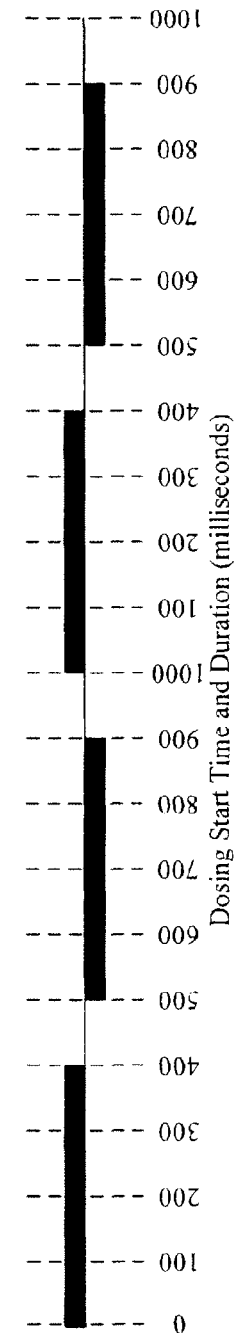
FIG. 8B is a graph of the alternating dosing of reductant by two dosing modules at another operational speed over a two second time period.
Figure 8C:
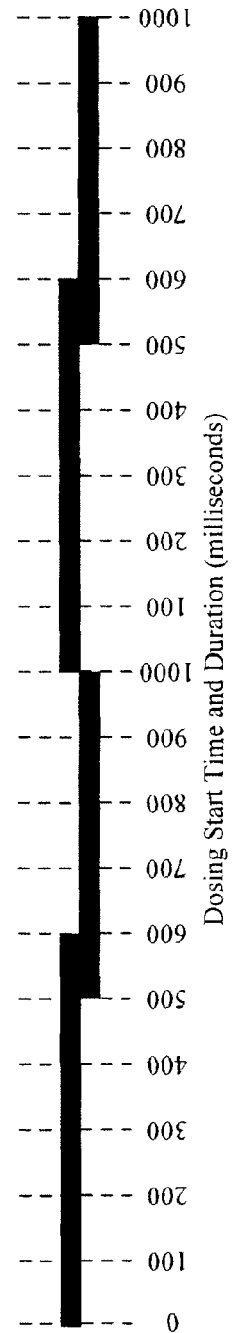
FIG. 8C is a graph of the alternating dosing of reductant by two dosing modules at yet another operational speed over a two second time period.
Figure 8D:
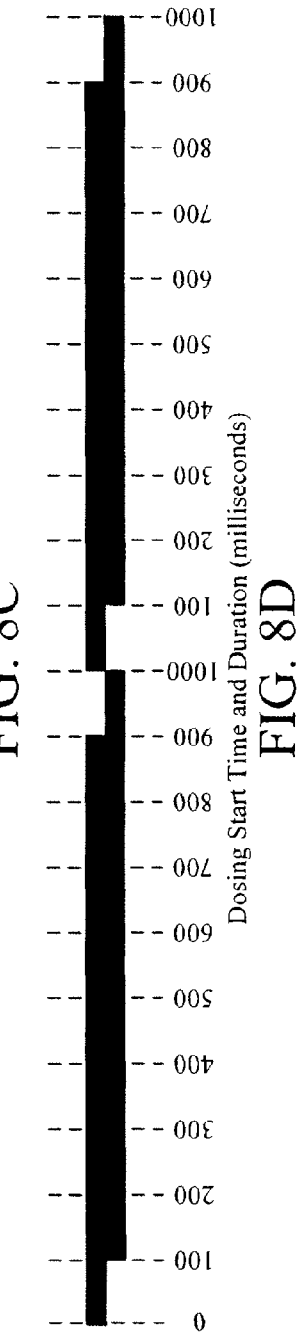
FIG. 8D is a graph of the alternating dosing of reductant by two dosing modules at still yet another operational speed over a two second time period.

FIGS. 8A-8D depict such alternating dosing of the first dosing module and the second dosing module over a time period of two seconds. FIG. 8A depicts a graph 800 of the alternating dosing of reductant by two dosing modules at a first operational speed over a two second time period. FIG. 8B depicts a graph 810 of the alternating dosing of reductant by two dosing modules at another operational speed over a two second time period. FIG. 8C depicts a graph 820 of the alternating dosing of reductant by two dosing modules at yet another operational speed over a two second time period. FIG. 8D depicts a graph 830 of the alternating dosing of reductant by two dosing modules at still yet another operational speed over a two second time period.

Figure 9:
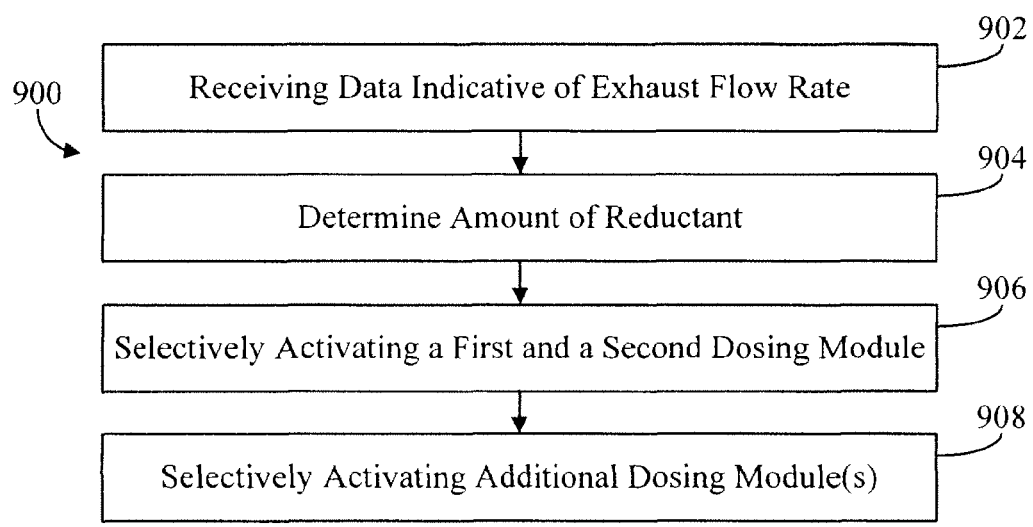
FIG. 9 is a flow diagram of another example process for a controller to control the dosing of reductant into an exhaust system using plurality of dosing modules.

FIG. 9 is a flow diagram of an example process 900 for a controller to control the dosing of reductant into an exhaust system using plurality of dosing modules. At 902, the process 900 includes receiving data indicative of an exhaust flow rate. The data indicative of the exhaust flow rate may include and/or be determined based on an engine speed selection, a flow velocity measurement, or a combination of calculated and measured components including air mass flow, fuel flow, temperature, pressure, rate of change of these parameters, or a combination of all or some of these parameters, etc. The data indicative of the exhaust flow rate may be communicated from one or more sensors.

At 904, an amount of reductant may be determined by a controller. The amount of reductant may be determined based, at least in part, on the data indicative of the exhaust flow rate. For example, amount of reductant may be determined based on an engine speed selection (e.g., an operating speed of the engine at known speed-load points) or engine operating parameters. In other implementations, the amount of reductant may be determined based on other data, either in addition or instead of the data indicative of the exhaust flow rate. The amount of reductant may be based on a dosing rate of one of more dosing modules, an exhaust gas temperature, etc.

At 906, a first dosing module and a second dosing module are selectively activated by a controller. In some implementations, the first dosing module may be selectively activated to provide the amount of reductant for a first time period. The second dosing module may be selectively activated to provide the amount of reductant for a second time period. Thus, the first dosing module and the second dosing module may alternatingly provide the amount of reductant over the first time period and the second time period. In some instances, such as when the first dosing module may, by itself, not be able to meet the amount of reductant, the second dosing module may be selectively activated with the first dosing module for a period of time to supplement the dosing provided by the first dosing module. At 908, in some implementations, a third dosing module may be selectively activated by a controller. The selective activation of the third dosing module may be at a third time that is based on the first time, the second time, and the decomposition delay time. Additional dosing modules may be activated as needed in a similar process by a controller.

Figure 10:
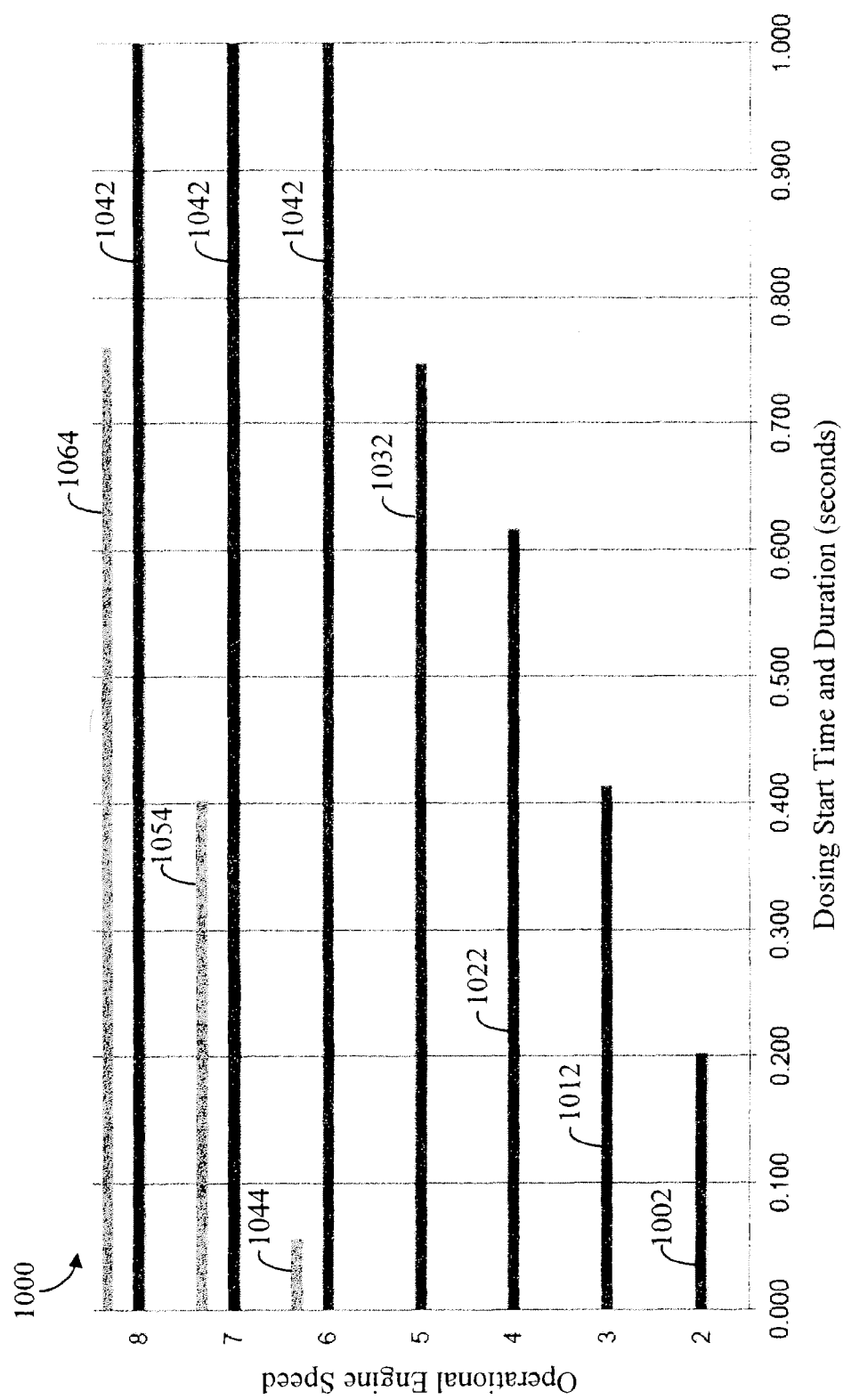
FIG. 10 is a graph of the dosing of reductant by two dosing modules over several operational speeds over a one second time period.

FIG. 10 is a graph 1000 of the dosing of reductant by two dosing modules over several operational engine speeds over a one second time period. At a first operational speed, a first dosing module doses reductant for a first period of time 1002. At a second operational speed, the first dosing module doses reductant for a second period of time 1012. At a third operational speed, the first dosing module doses reductant for a third period of time 1022. At a fourth operational speed, the first dosing module doses reductant for a fourth period of time 1032.

At a fifth operational speed, the first dosing module doses reductant for a fifth period of time 1042, which is for the entire one second period of time. The second dosing module may be selectively activated to dose reductant for a second period of time 1044 to supplement the dosing by the first dosing module. The first dosing module and the second dosing module may both be selectively activated at the same time or, in some implementations, the selective activation of the second dosing module may be offset by a time delay. At a sixth operational speed, the first dosing module doses reductant for the fifth period of time 1042. The second dosing module may be selectively activated to dose reductant for a second period of time 1054 to supplement the dosing by the first dosing module. The first dosing module and the second dosing module may both be selectively activated at the same time or, in some implementations, the selective activation of the second dosing module may be offset by a time delay. At a seventh operational speed, the first dosing module doses reductant for the fifth period of time 1042. The second dosing module may be selectively activated to dose reductant for a third period of time 1064 to supplement the dosing by the first dosing module. The first dosing module and the second dosing module may both be selectively activated at the same time or, in some implementations, the selective activation of the second dosing module may be offset by a time delay.

Figure 11A:
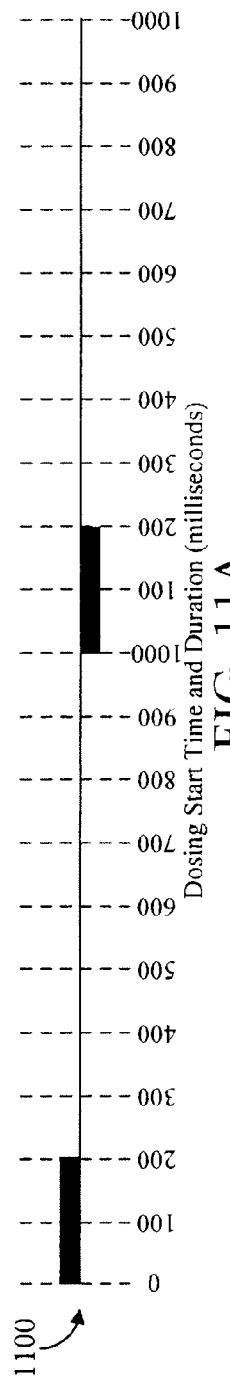
FIG. 11A is a graph of the alternating dosing of reductant by two dosing modules at a first operational speed over a two second time period.
Figure 11B:
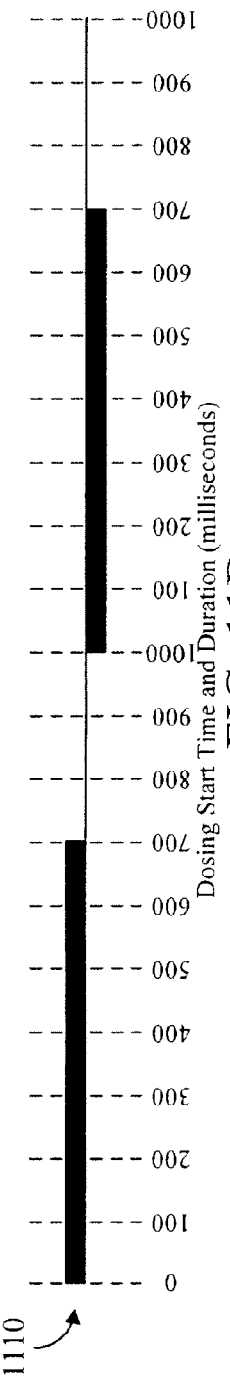
FIG. 11B is a graph of the alternating dosing of reductant by two dosing modules at another operational speed over a two second time period.
Figure 11C:
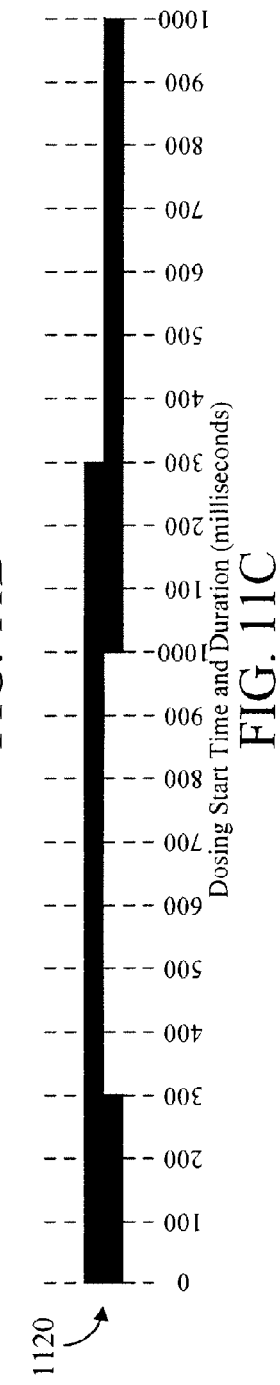
FIG. 11C is a graph of the alternating dosing of reductant by two dosing modules at yet another operational speed over a two second time period.
Figure 11D:
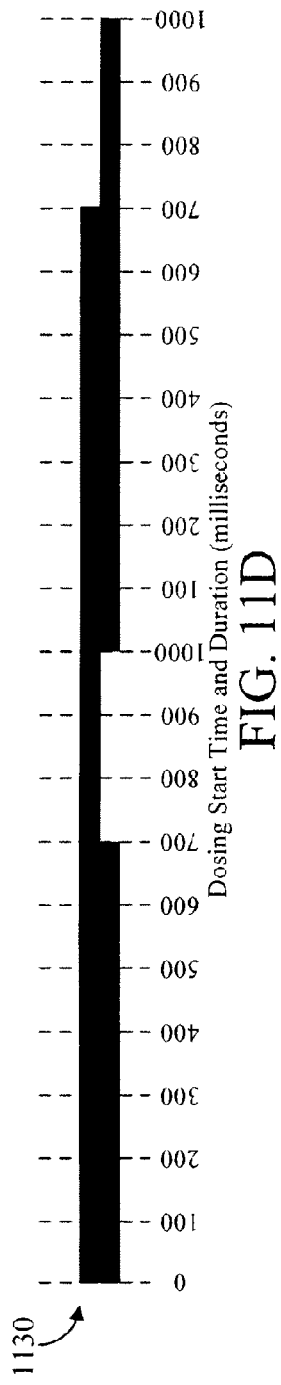
FIG. 11D is a graph of the alternating dosing of reductant by two dosing modules at still yet another operational speed over a two second time period.

FIGS. 11A-11D depict alternating dosing by the first dosing module and the second dosing module over a time period of two seconds. FIG. 11A depicts a graph 1100 of the alternating dosing of reductant by two dosing modules at a first operational speed over a two second time period. FIG. 11B depicts a graph 1110 of the alternating dosing of reductant by two dosing modules at another operational speed over a two second time period. FIG. 11C depicts a graph 1120 of the alternating dosing of reductant by two dosing modules at yet another operational speed over a two second time period. FIG. 11D depicts a graph 1130 of the alternating dosing of reductant by two dosing modules at still yet another operational speed over a two second time period.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. The subject matter described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, flash drives, or other storage devices). Accordingly, the computer storage medium is both tangible and non-transitory.

The operations described in this specification can be performed by a data processing apparatus on data stored on one or more computer-readable storage devices or received from other sources.

The term "controller" encompasses all kinds of apparatus, devices, and machines for processing data, including by way of example a programmable processor, a computer, a system on a chip, or multiple ones, a portion of a programmed processor, or combinations of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code).

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, the separation of various system components in the implementations described above should not be understood as requiring such separation in all implementations, and it should be understood that the described components and systems can generally be integrated in a single product or packaged into multiple products embodied on tangible media.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims. Additionally, it is noted that limitations in the claims should not be interpreted as constituting "means plus function" limitations under the United States patent laws in the event that the term "means" is not used therein.

The terms "coupled," "connected," and the like as used herein mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another or with the two components or the two components and any additional intermediate components being attached to one another.

The terms "fluidly coupled," "in fluid communication," and the like as used herein mean the two components or objects have a pathway formed between the two components or objects in which a fluid, such as water, air, gaseous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the system shown in the various exemplary implementations is illustrative only and not restrictive in character. All changes and modifications that come within the spirit and/or scope of the described implementations are desired to be protected. It should be understood that some features may not be necessary and implementations lacking the various features may be contemplated as within the scope of the application, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system for selectively dosing reductant into an exhaust system, the system comprising:
   a first dosing module;
   a second dosing module; and
   a controller, the controller configured to:
      receive data indicative of an exhaust gas temperature in the exhaust system,
      determine an amount of reductant based, at least in part, on the data indicative of the exhaust gas temperature,
      determine a decomposition delay time,
      selectively activate the first dosing module at a first time, and
      selectively activate the second dosing module at a second time, the second time based on the first time and the decomposition delay time.

2. The system of claim 1, wherein the reductant is diesel exhaust fluid.

3. The system of claim 1, wherein the second dosing module is selectively activated while the first dosing module is activated.

4. The system of claim 1, wherein the second dosing module is selectively activated after the first dosing module is deactivated.

5. The system of claim 1, wherein the second dosing module is selectively activated when the first dosing module is selectively deactivated.

6. The system of claim 1, further comprising:
   a third dosing module;
   wherein the controller is further configured to selectively activate the third dosing module at a third time, the third time based on the first time, the second time, and the decomposition delay time.

7. The system of claim 1, wherein the first dosing module and the second dosing module are mounted such that the first dosing module and the second dosing module dose reductant into a decomposition chamber.

8. The system of claim 7, wherein the first dosing module and the second dosing module are mounted on opposing sides of the decomposition chamber.

9. The system of claim 1, wherein the amount of reductant is further based on data indicative of an exhaust flow rate.

10. The system of claim 1, wherein the controller is configured to selectively activate the first dosing module at the first time to dose a first amount of reductant and to selectively activate the second dosing module at the second time to dose a second amount of reductant, a sum of the first amount of reductant and the second amount of reductant approximately equaling the determined amount of reductant.

11. A method for selectively dosing reductant into an exhaust system, the method comprising:
   receiving, at a controller, data indicative of an exhaust gas temperature in the exhaust system;
   determining, using the controller, an amount of reductant based, at least in part, on the data indicative of the exhaust gas temperature;
   determining, using the controller, a decomposition delay time;
   selectively activating, using the controller, a first dosing module at a first time; and
   selectively activating, using the controller, a second dosing module at a second time, the second time based on the first time and the decomposition delay time.

12. The method of claim 11, further comprising:
   selectively deactivating, using the controller, the first dosing module after the second dosing module is selectively activated.

13. The method of claim 11, further comprising:
   selectively deactivating, using the controller, the first dosing module before the second dosing module is selectively activated.

14. The method of claim 11, further comprising:
   selectively deactivating, using the controller, the first dosing module when the second dosing module is selectively activated.

15. The method of claim 11, further comprising:
   selectively activating, using the controller, a third dosing module at a third time, the third time based on the first time, the second time, and the decomposition delay time.

16. The method of claim 11, wherein the selectively activating of the first dosing module at the first time doses a first amount of reductant and the selectively activating the second dosing module at the second time doses a second amount of reductant, a sum of the first amount of reductant and the second amount of reductant approximately equaling the determined amount of reductant.

17. A non-transitory computer-readable medium storing instructions that, when executed by one or more processors, cause the one or more processors perform operations comprising:
   receiving data indicative of an exhaust gas temperature in an exhaust system;
   determining an amount of reductant based, at least in part, on the data indicative of the exhaust gas temperature;
   determining a decomposition delay time;
   selectively activating a first dosing module at a first time; and
   selectively activating a second dosing module at a second time, the second time based on the first time and the decomposition delay time.

18. The non-transitory computer-readable medium of claim 17 storing instructions that cause the one or more processors to perform operations further comprising:
   selectively deactivating the first dosing module after the second dosing module is selectively activated.

19. The non-transitory computer-readable medium of claim 17 storing instructions that cause the one or more processors to perform operations further comprising:
   selectively activating, using the controller, a third dosing module at a third time, the third time based on the first time, the second time, and the decomposition delay time.

20. The non-transitory computer-readable medium of claim 17 storing instructions that cause the one or more processors to perform operations further comprising:
   selectively activating the first dosing module at the first time to dose a first amount of reductant and selectively activating the second dosing module at the second time to dose a second amount of reductant, a sum of the first amount of reductant and the second amount of reductant approximately equaling the determined amount of reductant.

* * * * *